Aug. 28, 1951          S. P. CAMPBELL                2,565,677
                   VAPORIZING POT TYPE BURNER
                      Filed Oct. 27, 1947

INVENTOR
Shirley Pollard Campbell
BY Fishburn & Mullendore
ATTORNEYS

Patented Aug. 28, 1951

2,565,677

UNITED STATES PATENT OFFICE 2,565,677

VAPORIZING POT TYPE BURNER

Shirley Pollard Campbell, Wichita, Kans., assignor to The Coleman Company, Inc., Wichita, Kans., a corporation of Kansas Application October 27, 1947, Serial No. 782,317

1 Claim. (Cl. 158—91)

This invention relates to vaporizing pot type burners for burning liquid hydrocarbon fuels and has for its principal object to provide a burner of this character which is adapted for efficient and quiet operation.

The usual pot type burner has been objectionable because of the roar or pulsations produced in burning of the fuel vapors and I have discovered that such objectionable action results from differential pressures on the respective sides of the upper burner ring and that this differential pressure further results in displacement of the flame front.

In the present invention I have overcome these difficulties by providing a burner pot and upper ring structure wherewith pressure differentials are balanced out and the flame front is stabilized by circulating final combustion products from the combustion chamber of a heating unit back through the burner pot for admixture with secondary air and intermediate products of combustion within the burner pot.

A further object of the invention is to provide for better mixture of the secondary air with the vapors and intermediate products of combustion.

In accomplishing these and other objects of the invention hereinafter pointed out, I have provided improved structure, the preferred form of which is illustrated in the accompanying drawing wherein.

Figure 1:
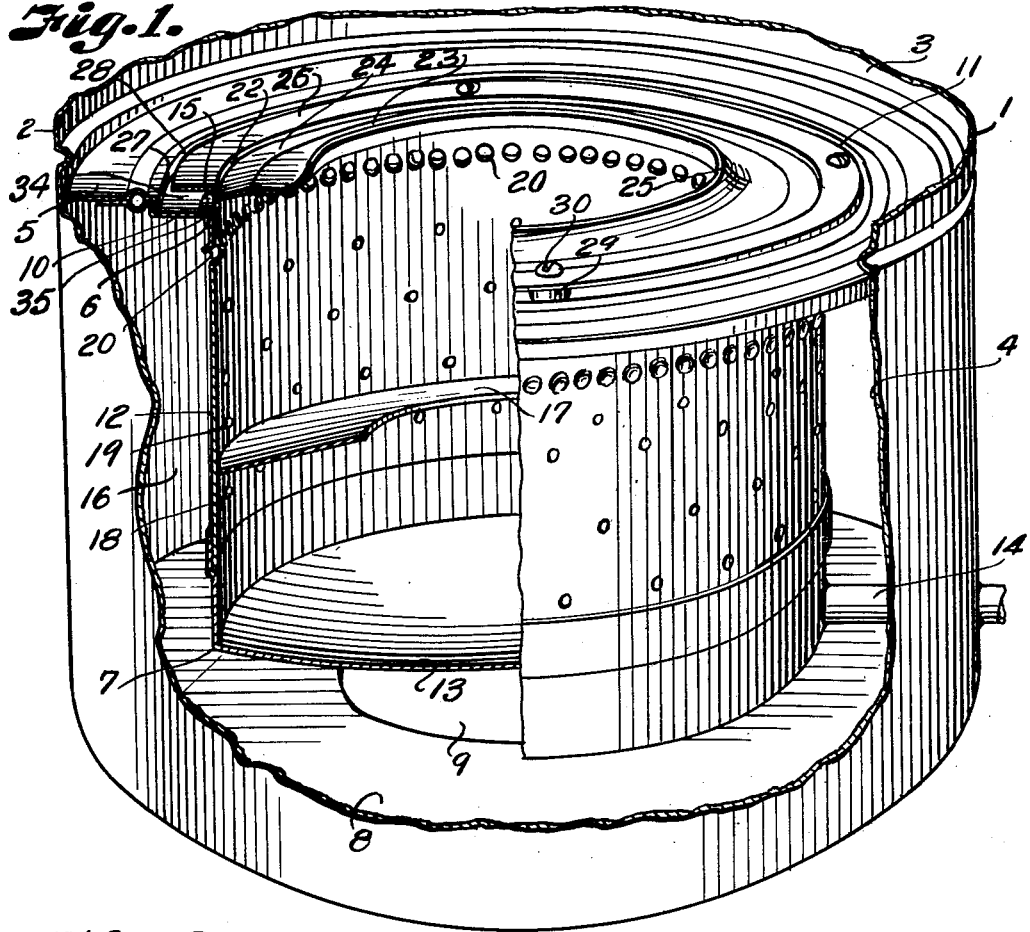
Fig. 1 illustrates the lower portion of a heating unit equipped with a burner pot and upper fire ring constructed in accordance with the present invention.

Referring more in detail to the drawings:

1 designates the lower portion of a heating unit having an annular wall 2 forming a combustion chamber 3 and a burner chamber 4 separated by a horizontal partition 5 having an opening 6 in which a burner pot 7 is suspended within the burner pot chamber. The bottom of the burner pot chamber 4 is closed by a substantially ring-shaped plate 8 which encircles air inlet opening 9 that admits combustion-supporting air into the burner pot chamber. The partition 5 may be formed in any suitable manner to provide a substantially leak-tight closure between the combustion and burner pot chambers and to provide an annular shoulder or ledge 10 for supporting the burner pot and seating the upper or high fire ring 11. The burner pot 7 is of substantially conventional construction in that it includes an annular wall 12 having a concave bottom 13 for supporting a pool of liquid hydrocarbon fuel that is admitted into the burner pot through a supply pipe 14. The upper portion of the annular wall of the burner pot terminates in a lateral flange 15 that seats on the ledge 10 to support the burner pot in suspended relation with the walls and bottom of the burner pot chamber and provide a substantially annular air passageway 16 therearound for movement of the air that is admitted through the opening 9. The inside of the burner pot is provided with a low fire ring 17 that is located above air inlet openings 18 in the wall of the pot which admit primary air under the low fire ring for supporting combustion of the fuel vaporizing under low fire regulation of the fuel. The wall of the burner pot is also provided above the low fire ring with a plurality of air inlet openings 19 for admitting additional primary combustion supporting air to effect ignition of the fuel vapors that vaporize from the pool of fuel in the bottom of the pot.

Figure 2:
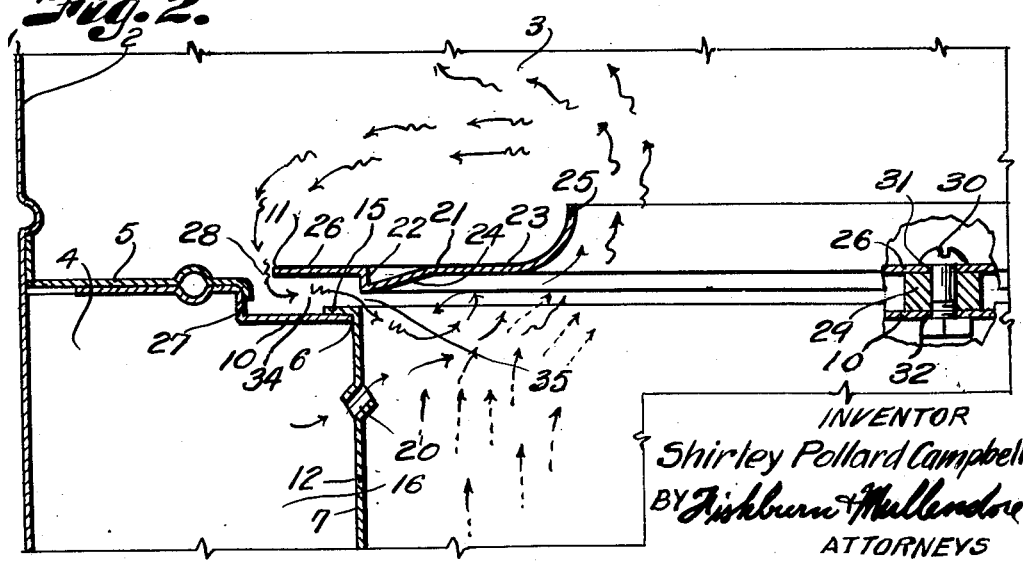
Fig. 2 is an enlarged fragmentary section through one side of the heating unit particularly illustrating recirculation of final products of combustion from the combustion chamber back into the burner pot for mixture with the secondary air and fuel vapors.

In order to assure combustion of intermediate products of combustion, the wall of the burner pot is provided directly under the upper fire ring with a circumferential series of air inlet openings 20 which, in accordance with the present invention, are directed upwardly to discharge under the upper fire ring 11 as best shown in Fig. 2.

The upper fire ring 11 includes a horizontal plate portion 21 having an offset portion 22 adjacent the wall of the pot and which joins with the inner portion 23 of the ring by an upwardly and inwardly flaring annular portion 24 that terminates in an upwardly and inwardly curving annular collar 25 which directs the products of combustion into the combustion chamber. The outer portion 26 of the fire ring extends over the inner marginal ledge 10 of the partition ring 5 and terminates adjacent an annular offset 27 therein to provide an annular inlet opening 28 encircling the fire ring for a purpose later described. The fire ring is supported from the ledge portion 10 by spacers 29 that are positioned between the ledge portion 10 and the rim portion 26 of the ring as best shown in Fig. 2, the spacers being retained in position and the ring in centered relation with the fire pot by means of fastening devices such as bolts or the like 30 that extend through suitable openings 31 in the portion 26 of the ring and through similar openings 32 in the portion 10 of the partition ring (Fig. 2).

The construction just described differentiates from the usual burner pot construction in that the conventional upper fire ring seats directly upon the upper portion of the fire pot so as to close any space between the ledge portion 10 of the partition and the outer portion 26 of the fire ring. Consequently, the pressure contained in the burner pot immediately below the fire ring varies from the pressure above the ring to cause a fluctuating flame front and the objectionable roar or pulsation characteristics of such burners. With the present invention, the uper fire ring being spaced from the ledge portion of the partition ring, provides an expansion chamber through which equalization of pressures are established above and below the fire ring, the annular space 34 that is provided between the portion 26 of the upper ring and the ledge portion 10 forming the expansion chamber and which has an annular outlet 35 between the offset 22 and rim of the pot as best shown in Fig. 2.

This space also provides for recirculation of the final products of combustion from the lower portion of the combustion chamber for mixture with the secondary air admitted through the nozzle-like aperture 20 and the intermediate products of combustion to retard combustion and thereby raise the flame front.

In operating the burner pot constructed and assembled as described, fuel is admitted through the pipe 14 at the desired rate to maintain a pool of oil on the concave bottom 13 of the burner pot and the fuel is ignited to heat the burner pot and effect vaporization of the oil so that the vapors rise in the pot and contact with the combustion supporting air admitted through the openings 18 and 19. The hot products of combustion pass upwardly through the opening encircled by the annular collar 25 and into the combustion chamber. The intermediate products of combustion on passing the air inlet openings 20 are supplied with sufficient air to effect substantially complete combustion so that all the vapors are combusted before reaching the combustion chamber.

To maintain uniform pressure differentials on the respective sides of the uper burner ring, a portion of the products of combustion pass through the annular inlet opening 28 and annular outlet opening 35 for mixture with the secondary air so as to slow down the combustion that ordinarily causes roar and pulsation of the burner. This equalization of the pressure also results in establishing an equilibrium between the velocity flow of the secondary air and the combustion speed of the oil mixture, thereby maintaining more uniform ignition conditions at the flame front so as to avoid roar and pulsation resulting from irregular combustion and a variable flame front. This also results in diluting the products of combustion to slow down combustion of the vapors upon their contact with the air jets admitted through the nozzle-like openings 20 which further reduce objectionable roar and pulsation.

For example, the effect of circulation and pressure equalization may be comparable to the knocking in an internal combustion engine which action has been corrected by the addition of anti-knock compounds to the fuel for slowing down the speed of combustion and eliminating the explosion resulting from improper combustion.

The admixing of the products of combustion acts in the same way to slow down the burning rate of the fuel directly below the high fire ring and to provide for even and uniform combustion. If, for any reason, pulsations or explosions start below the fire ring, the pressure built up creates a positive pressure in the combustion chamber which forces combustion products through the inlet 28 and space 34 into the admixing space immediately below the burner top ring at a point between the secondary air inlet ports and the flange 23 of the burner ring. By arranging the nozzle-like secondary ports at a relatively steep angle turbulence is set up under the fire ring in which the products of combustion, the vapors and the secondary air are thoroughly mixed which further slows down the speed of combustion and further sets up a more uniform and stable flame front.

It is thus obvious that I have provided a pot type burner which is more efficient in operation and which is capable of operating to provide a stable flame front thereby reducing or substantialy eliminating the customary roar and pulsations that have been characteristic of pot type burners.

What I claim and desire to secure by Letters Patent is:

In a heating device, a burner pot having an annular wall provided with perforations for admitting air into said pot, a combustion chamber provided with a bottom member having an inner marginal ledge portion encircling the wall of the burner pot and having a tight connection therewith, said inner marginal ledge portion being downset from an outer portion of said bottom member and connected therewith by an annular portion offsetting said ledge and outer portions, a fire ring having an inner portion extending inwardly over the burner pot and an outer marginal portion spaced above the ledge portion with the outer edge thereof spaced inwardly from said annular offsetting portion to provide an annular opening for passage of spent products of combustion from the combustion chamber into a passageway formed between the outer marginal portion of the fire ring and said ledge portion, said fire ring having a downwardly extending portion substantially registering with the wall of the burner pot and terminating short thereof to provide an outlet into the burner pot for admitting said spent products of combustion under the inner portion of the fire ring, said inner portion of the fire ring having an annular portion sloping upwardly and inwardly from said downwardly extending portion and terminating in an inwardly extending and upwardly curving collar portion forming a connection between the burner pot and the combustion chamber, the downwardly extending portion of the fire ring and the offsetting portion of the bottom member forming inner and outer walls of the passageway, said wall of the burner pot having upwardly directed nozzle-like openings for admitting secondary air under said inner portion of the fire ring for turbulent movement across the outlet of the spent products of combustion for mixture with the spent products of combustion to result in slowing down of combustion under the inwardly extending portion of the fire ring, and means for fixing the fire ring relatively to the bottom member to maintain said passageway.

SHIRLEY POLLARD CAMPBELL.

REFERENCES CITED

The following references are of record in the file of this patent:

UNITED STATES PATENTS

| Number | Name | Date |
| --- | --- | --- |
| 1,633,549 | Little | June 21, 1927 |
| 2,180,444 | Valjean | Nov. 21, 1939 |
| 2,243,916 | Mueller | June 3, 1941 |
| 2,339,637 | Hayter | Jan. 18, 1944 |
| 2,506,138 | Clark | May 2, 1950 |